(12) United States Patent
Reddy et al.

(10) Patent No.: US 12,164,579 B2
(45) Date of Patent: Dec. 10, 2024

(54) BINDING TRAITS TO CASE NODES

(71) Applicant: OPEN TEXT CORPORATION, Waterloo (CA)

(72) Inventors: Satyapal P. Reddy, San Ramon, CA (US); Jeroen Mattijs Van Rotterdam, Fort Lauderdale, FL (US); Michael T. Mohen, Millington, MD (US); Muthukumarappa Jayakumar, Mountain House, CA (US); Ravikumar Meenakshisundaram, Pleasanton, CA (US)

(73) Assignee: Open Text Corporation, Waterloo (CA)

( * ) Notice: Subject to any disclaimer, the term of this patent is extended or adjusted under 35 U.S.C. 154(b) by 0 days.

(21) Appl. No.: 18/478,423

(22) Filed: Sep. 29, 2023

(65) Prior Publication Data

US 2024/0020344 A1    Jan. 18, 2024

Related U.S. Application Data

(63) Continuation of application No. 17/404,035, filed on Aug. 17, 2021, now Pat. No. 11,893,066, which is a
(Continued)

(51) Int. Cl.
*G06F 16/93*   (2019.01)
*G06F 8/20*    (2018.01)
(Continued)

(52) U.S. Cl.
CPC .............. *G06F 16/93* (2019.01); *G06F 8/24* (2013.01); *G06F 16/2228* (2019.01);
(Continued)

(58) Field of Classification Search
CPC ...... G06F 16/93; G06F 16/83; G06F 16/2228; G06F 16/282; G06F 16/2453;
(Continued)

(56) References Cited

U.S. PATENT DOCUMENTS 5,280,610 A * 1/1994 Travis, Jr. ............... G06F 9/465
707/999.009
11,893,066 B2  2/2024 Reddy et al.
(Continued)

OTHER PUBLICATIONS

Office Action issued for U.S. Appl. No. 18/538,120, mailed Jul. 3, 2024, 26 pages.
(Continued)

*Primary Examiner* — James E Richardson
*Assistant Examiner* — Nirav K Khakhar
(74) *Attorney, Agent, or Firm* — Sprinkle IP Law Group

(57) ABSTRACT

Case management systems and techniques are disclosed. In various embodiments, for each of a plurality of case nodes comprising a case model a trait definition comprising a corresponding set of traits associated with that case node is received. The respective trait definitions are used to bind each set of traits to the case node with which the set of traits is associated in case instances created based on the case model.

24 Claims, 13 Drawing Sheets

Related U.S. Application Data continuation of application No. 16/586,124, filed on Sep. 27, 2019, now Pat. No. 11,106,743, which is a continuation of application No. 14/502,281, filed on Sep. 30, 2014, now Pat. No. 10,467,295.

(60) Provisional application No. 62/031,594, filed on Jul. 31, 2014.

(51) Int. Cl.
| | |
|---|---|
| *G06F 16/22* | (2019.01) |
| *G06F 16/2453* | (2019.01) |
| *G06F 16/28* | (2019.01) |
| *G06F 16/83* | (2019.01) |
| *G06F 40/186* | (2020.01) |
| *G06Q 10/067* | (2023.01) |

(52) U.S. Cl.
CPC ...... *G06F 16/2264* (2019.01); *G06F 16/2453* (2019.01); *G06F 16/282* (2019.01); *G06F 16/83* (2019.01); *G06F 40/186* (2020.01); *G06Q 10/067* (2013.01)

(58) Field of Classification Search
CPC ...... G06F 16/2264; G06F 40/186; G06F 8/24; G06Q 10/067
See application file for complete search history.

(56) References Cited

U.S. PATENT DOCUMENTS

| | | | |
|---|---|---|---|
| 11,899,635 | B2 | 2/2024 | Reddy et al. |
| 11,941,068 | B2 | 3/2024 | Reddy et al. |
| 2002/0104068 | A1* | 8/2002 | Barrett ............... G06F 8/24 717/162 |
| 2014/0330612 | A1* | 11/2014 | Lemcke ........ G06Q 10/06316 705/7.26 |
| 2016/0019243 | A1* | 1/2016 | Kamel ............... G06F 16/285 707/803 |
| 2023/0409648 | A1 | 12/2023 | van Rotterdam et al. |
| 2024/0111741 | A1 | 4/2024 | Reddy et al. |
| 2024/0176825 | A1 | 5/2024 | Reddy et al. |

OTHER PUBLICATIONS

Office Action issued for U.S. Appl. No. 18/436,114, mailed Sep. 11, 2024, 7 pages.

* cited by examiner

BINDING TRAITS TO CASE NODES

CROSS REFERENCE TO OTHER APPLICATIONS

This application is a continuation of, and claims a benefit of priority under 35 U.S.C. 120 of the filing date of U.S. patent application Ser. No. 17/404,035, filed Aug. 17, 2021, entitled BINDING TRAITS TO CASE NODES," issued as U.S. Pat. No. 11,893,066, which is a continuation of, and claims a benefit of priority under 35 U.S.C. § 120 of the filing date of U.S. patent application Ser. No. 16/586,124, filed Sep. 27, 2019, entitled "BINDING TRAITS TO CASE NODES," issued as U.S. Pat. No. 11,106,743, which is a continuation of, and claims a benefit of priority under 35 U.S.C. § 120 of the filing date of U.S. patent application Ser. No. 14/502,281, filed Sep. 30, 2014, entitled "BINDING TRAITS TO CASE NODES," issued as U.S. Pat. No. 10,467,295, which claims a benefit of priority under 35 U.S.C. § 119 (e) to U.S. Provisional Patent Application No. 62/031,594, filed Jul. 31, 2014, entitled "BINDING TRAITS AND EXTERNAL OBJECTS TO CASE MODEL NODES AND COMPOSITE INDEX FOR SAME," all of which are incorporated herein by reference for all purposes.

BACKGROUND OF THE TECHNOLOGY

Case management systems, software, and/or cloud-based or other electronically-provided case management services (collectively, "Case Management Systems") are used to automate the management of complex sets of documents or other content and associated business or other processes, particularly in situations in which the documents or other content that may need to be managed for respective particular instances of a case model/type (e.g., a loan application) may not be the same for each instance and the processing required and/or selected to be performed may not be the same for each instance.

A case model ("Case Model") typically describes a type of case, instances of which are to be managed by a Case Management System. As opposed to very structured business process that defines a predetermined work flow that does not vary from instance to instance, using a Case Model one can model ad hoc actions and define responses thereto with mini workflows, enabling the processing of respective instances of a Case Model to be determined dynamically at runtime based, e.g., on events, context data, user input, dynamic evaluation of documents or other content, etc. As a result, each instance of a Case Model (e.g., the respective loan applications of different applicants) may follow its own course as determined at each step by processing as defined in applicable portions of the Case Model.

BRIEF DESCRIPTION OF THE DRAWINGS

Various embodiments of the technology are disclosed in the following detailed description and the accompanying drawings.

DETAILED DESCRIPTION

The technology can be implemented in numerous ways, including as a process; a system; a computer program product embodied on a computer readable storage medium; and/or a processor, such as a processor configured to execute instructions stored on and/or provided by a memory coupled to the processor. In general, the order of the steps of disclosed processes may be altered within the scope of the technology. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the technology is provided below along with accompanying figures that illustrate the technology. The technology is described in connection with such embodiments, but the technology is not limited to any embodiment. The scope of the technology is limited only by the claims and the technology encompasses numerous alternatives, modifications and equivalents. Numerous specific details are set forth in the following description in order to provide a thorough understanding of the technology. These details are provided for the purpose of example and the technology may be practiced according to the claims without some or all of these specific details.

Binding traits (e.g., metadata and behavior) at each case node of a case model is disclosed. In various embodiments, within a case model, the hierarchical/nested container model reflects a data model and how the documents/contents of a case are organized, what data they contain, and how they behave. In various embodiments, all possible "bags" (i.e., sets) of metadata and behavior (also called traits) can be modeled and attached to each of the case nodes in the hierarchical container model. These traits in various embodiments not only define the metadata, but also the behavior at each of these case nodes. For example, adding a "nickname" may result in an associated behavior, e.g., informing team members that the nickname has been added.

Figure 1:
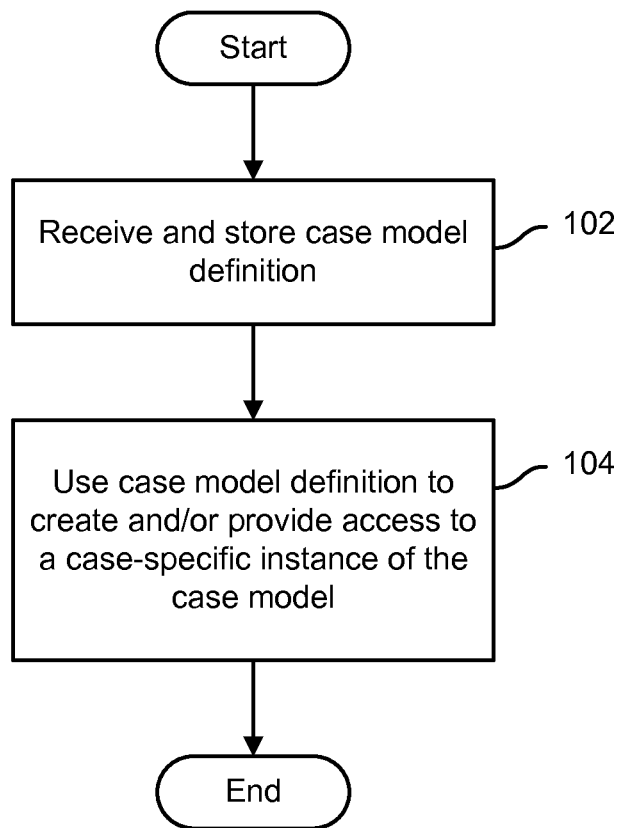
FIG. 1 is a flow chart illustrating an embodiment of a process to perform case management.

FIG. 1 is a flow chart illustrating an example embodiment of a process to perform case management. In the example shown, a case model definition is received and stored (102). The case model definition is used to create new instances based on the case model, sometimes referred to herein as "case instances" or "case management instances", and/or to provide access to previously-created instances (104). For example, a case model may be defined and stored for a loan application and associated processes. Case instances may be created based on the case model and each respective case instance used to manage a corresponding loan application, for example by different respective loan applicants.

A case model typically describes a case management system. Using a case model, one can model ad hoc actions with mini workflows, for example, as opposed to very structured process that defines an end-to-end business workflow. In various embodiments, a case model comprises a hierarchical/nested container model (sometimes referred to herein as a "hierarchical data model"), and may in addition define case roles, case phases (states), and/or permissions. In some embodiments, permissions may be defined for each case node and/or level in the hierarchy, and may vary in some embodiments based at least in part on the respective phases (states) of a state machine defined for a case node.

In various embodiments, a case model may include a hierarchical/nested container model. This model represents how the data within a case is organized and what data is captured during runtime. Each node in the hierarchy is sometimes referred to herein as a "case node". Case nodes at the lowest level of a case model hierarchy may be referred to as "case leaf nodes" or simply "leaf nodes". "Case leaf nodes" in various embodiments may point to a specific business object or document type.

The term "case role" is used herein to refer to user roles that have been defined in a case model. In various embodiments, users may be assigned to case roles with respect to instances of a case model, and at each case node in the case model permissions may be designated by reference to one or more case roles. During runtime in some embodiments members may be added or removed from these roles at case node instances corresponding to respective instances of a type of case as defined in a case model.

In various embodiments, at each case node a metadata model that defines one or more traits and/or associated behavior may be defined.

In various embodiments, a case model as described herein may be created using a domain-specific or other development module or tool. For example, reusable elements, such sample case nodes typical of those used in the domain (e.g., documents, case roles, behaviors, etc. Typically associated with a loan application process, a new drug approval application, etc.), primitives usable to define a state machine and/or associated processing for respective case nodes, etc., may be provided. For example, an application programming interface (API) may be defined, and/or a visual or other case model development tool may be provided.

In various embodiments, a case model definition is embodied in an eXtensible Markup Language (XML) or other structured data file. A case management system and/or platform is provided, which is configured (e.g., by software) to load a case model definition, parse the definition, and create an instance of the case model based on the definition. Instance-specific attributes and/or state information or other metadata may be stored in a case model instance data store, e.g., a database. At runtime, the case model definition file and the case model instance data for a given instance are used by the disclosed case management system to implement the case model instance, including by performing processing and managing case model instance associated content per the case model definition, in light of the current values of the case model instance data for that instance.

Figure 2:
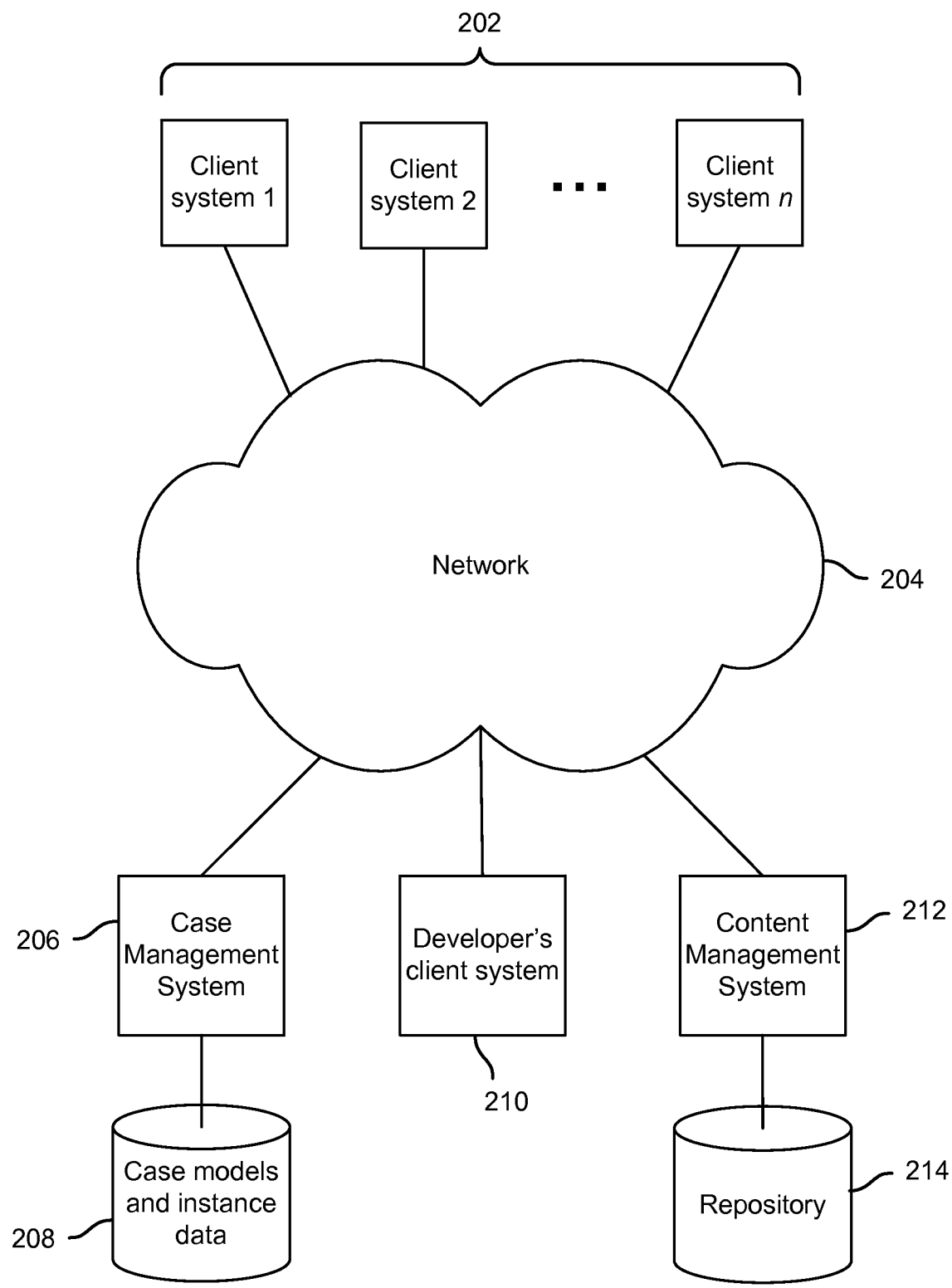
FIG. 2 is a block diagram illustrating an example embodiment of a case management system and environment.

FIG. 2 is a block diagram illustrating an example embodiment of a case management system and environment. In the example shown, client systems 202 are connected via a network 204, e.g., the Internet, to a case management system 206. In various embodiments, the case management system 206 may be configured to implement the process of FIG. 1. Case management system 206 uses case models stored in data storage 208 to provide case management services with respect to case management instances, the instance variable data values of which also are stored, in this example, in data storage 208. For example, one or more of clients 202 may connect via network 204 to case management system 206 to obtain access to case management services. For example, case management system 206 may expose a "case management system as a service", e.g., as a web service, enable clients 202 to connect to case management system 206, create case management instances based on case models stored in data storage 208. The users of client system 202 may be prompted to provide data values and/or other user input to populate case management instances with metadata, user data, documents, etc., and/or such other user input as may be required to advance case instances through case management processing as defined in the case model.

In the example shown in FIG. 2, a case model developer system 210, e.g., a client computer system, also can connect to case management system 206 via network 204. In some embodiments, a case model development user interface and/or service may be accessed and used to define a case model. For example, a visual or other developer tool may be presented to enable a developer using client system 210 to define a case model and cause the case model to be stored in data storage 208 and deployed by case management system 206. In some embodiments, deployment of a case model includes making the case model available to be used to create case management instances based on the model, and to use the case model to perform with respect to each such instance the case management processing as defined in the case model.

In various embodiments, a case model may indicate one or more content objects to be associated with respective instances of a case model. The case model may include metadata and associated behaviors to enable instance-specific content objects (e.g., documents) to be associated with case leaf nodes of a case instance. In the example shown in FIG. 2, content objects may be accessed via a content management system 212 configured to manage content objects stored in an associated content repository 214. In various embodiments, case management system 206 may be configured to use instance variables associated with a given case instance and metadata and/or behaviors defined in an associated case model to interact programmatically with content management system 212 to obtain and/or manage documents or other content objects associated with a case instance. In some embodiments, case management system 206 may be configured, e.g., via the case model, to invoke services and/or other functionality of content management system 212 with respect to such documents or other content objects.

Figure 3:
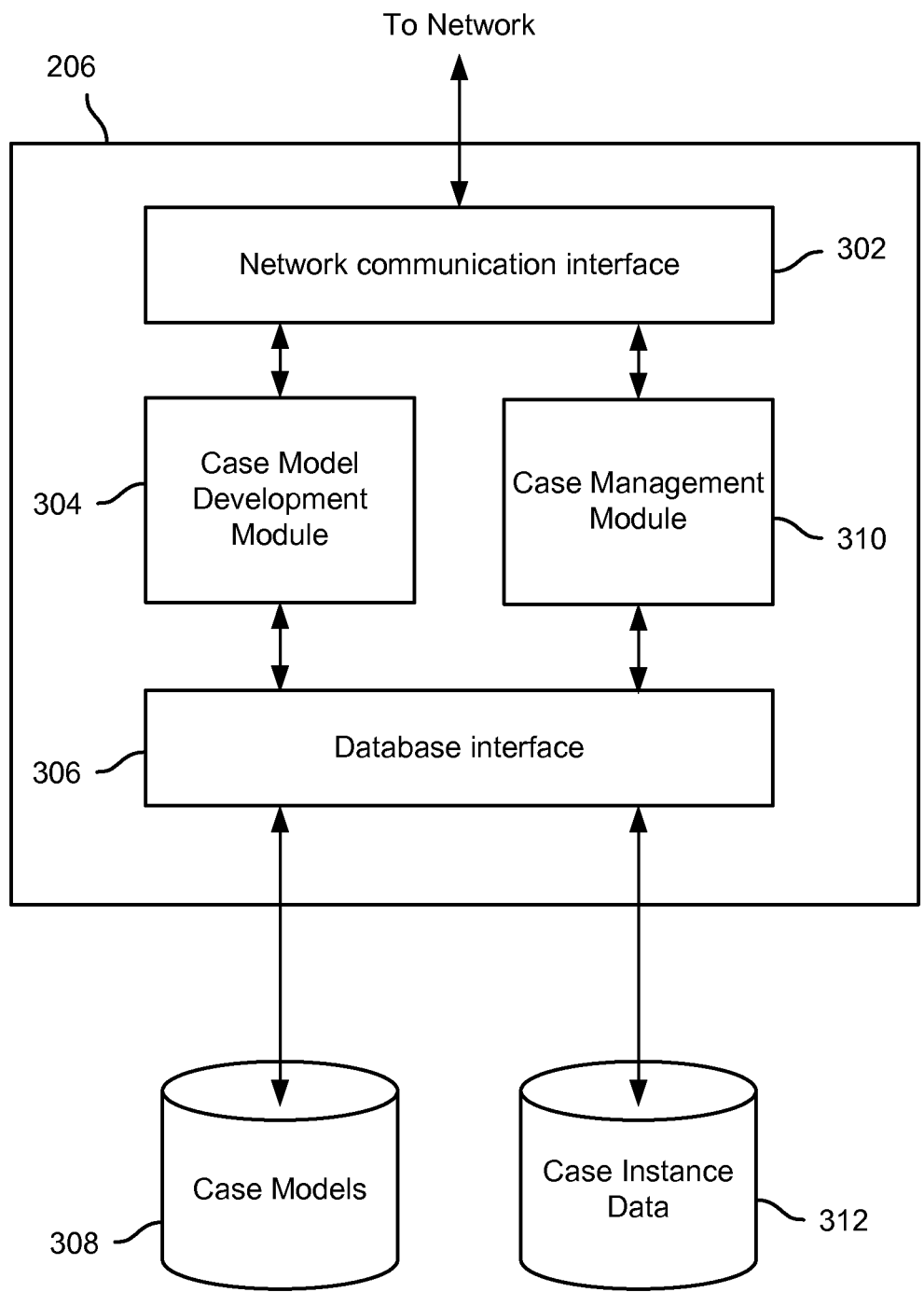
FIG. 3 is a block diagram illustrating an example embodiment of a case management system.

FIG. 3 is a block diagram illustrating an example embodiment of a case management system. In some embodiments, the case management system of FIG. 3 corresponds to case management system 206 of FIG. 2. In the example shown, case management system 206 includes a network communication interface 302, such as a wireless or other network interface card, to provide network connectivity, e.g., to network 204 of FIG. 2. A case model development module 304 is accessible to developers via network communication interface 302 and may be used to create and/or modify case model definitions. In some embodiments, a visual or other user interface is provided, via network communication interface 302, to enable case models to be created and/or modified. For example, a developer may use a browser to access the developer user interface in some embodiments. Case model definitions are stored by case model development module 304 by using a backend database (or other data storage) interface 306 to store the case model(s) in case model store 308.

Referring further to FIG. 3, the case management system 206 includes a case management module 310. In various embodiments, case management module 310 includes functionality to enable users, e.g., users of client systems 202 of FIG. 2, to create and/or use case management instances based on case models stored in case model store 308. Case management module 310, for example, may expose a web or other interface to remote users and may receive via said interface a request to create and/or access a case instance. Case management module 310 uses database interface 306 to obtain an associated case model definition from case model store 308, to use the case model to instantiate case instances. Instance variables are stored by case management module 310 in case instance data store 312.

Figure 4:
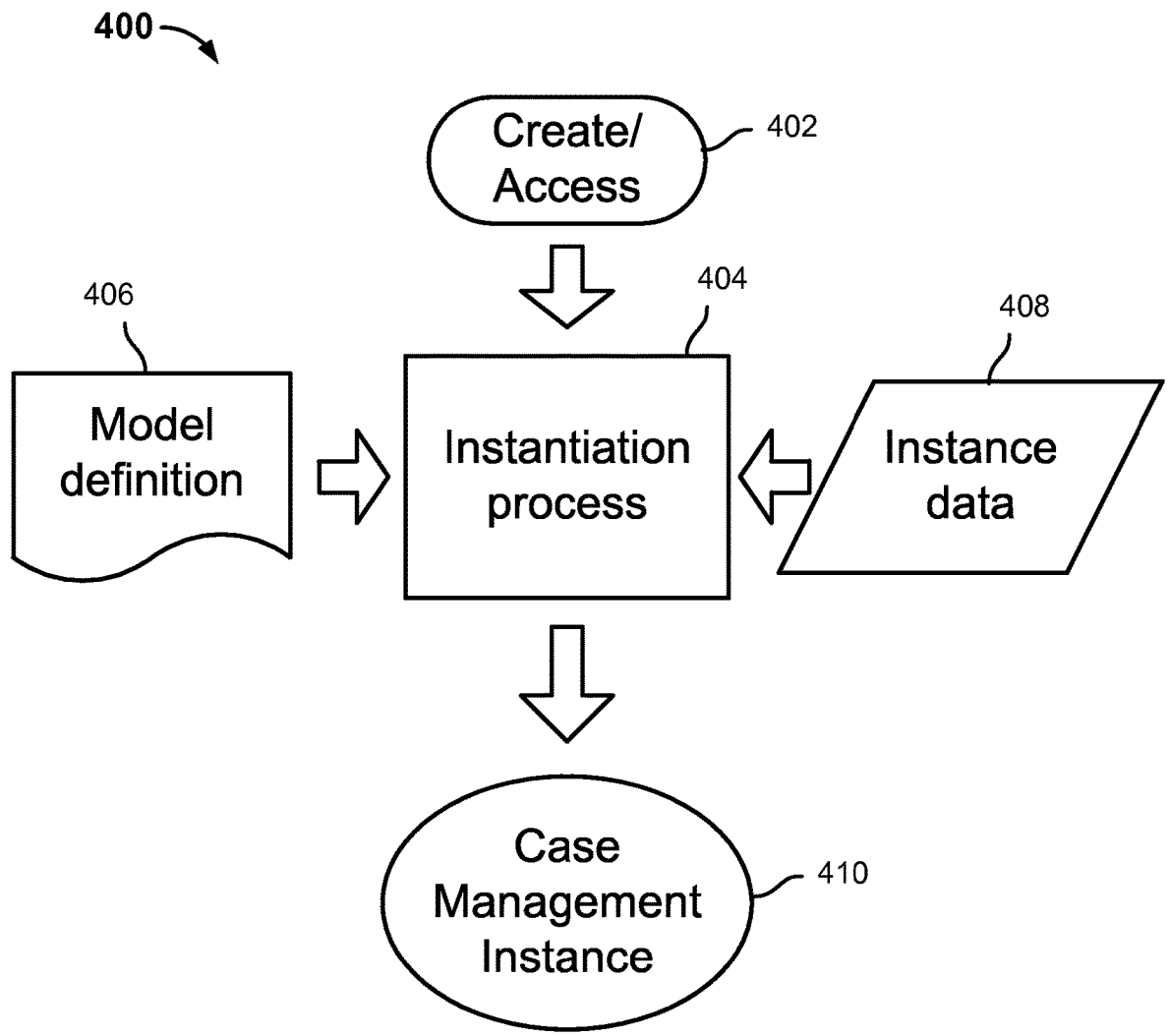
FIG. 4 is a diagram illustrating an example embodiment of a process and system to create and/or provide access to case management instances.

FIG. 4 is a diagram illustrating an example embodiment of a process and system to create and/or provide access to case management instances. In some embodiments, the process of FIG. 4 may be implemented by a case management system and/or a component thereof, such as case management module 310 of FIG. 3. In the example shown, case management system 400 receives a request 402 to create or access a case management instance and invokes instantiation process 404. Instantiation process 404 uses a case model definition 406 associated with the request, e.g., a case model indicated explicitly and/or otherwise associated with data comprising the request 402, and case management instance data 408 associated with the case management instance, to instantiate and provide access to a case management instance 410.

In various embodiments, a case model definition such as model definition 406 may include an XML file or other structured data, which the case management system is configured to parse and use to construct case instances based on the case model. For example, the hierarchical data structure may be defined, along with metadata and associated behaviors for each case node. A case management instance, such as case management instance 410, may include an in memory instance of a data structure defined in case model definition 406, which is used to store instance variables, such as instance data 408 in this example.

Figure 5:
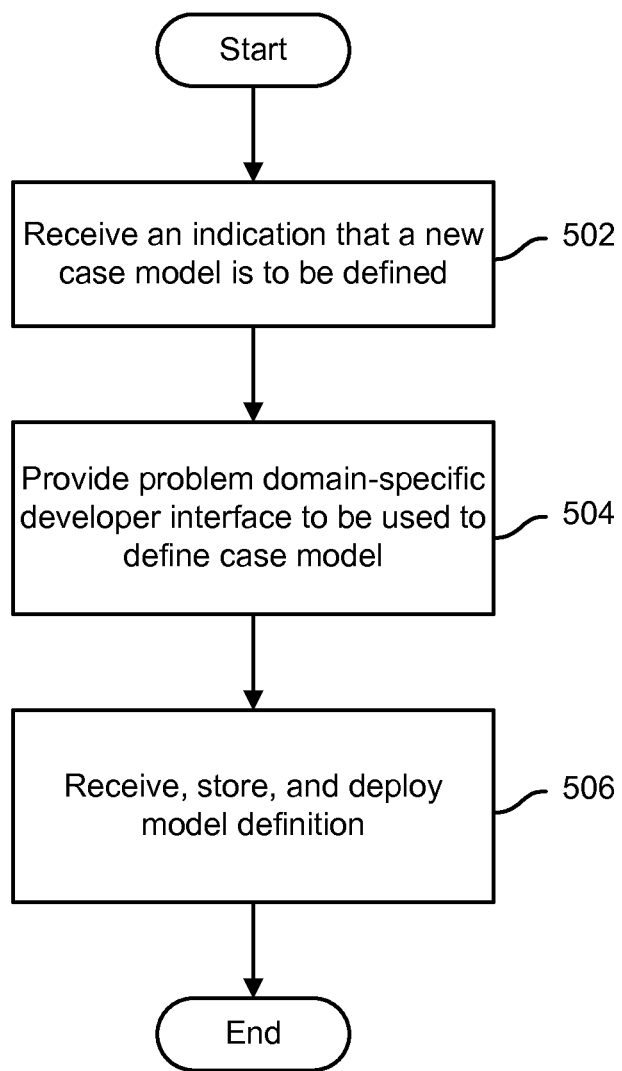
FIG. 5 is a flow chart illustrating an example embodiment of a process to receive and store a case model.

FIG. 5 is a flow chart illustrating an example embodiment of a process to receive and store a case model. In some embodiments, the process of FIG. 5 is used to implement step 102 of FIG. 1 and is performed by a case management system, such as case management system 206 of FIGS. 2, e.g., case model development module 304 of FIG. 3. In the example shown, an indication that a new case model is to be defined is received (502). A problem domain-specific developer interface to be used to define the case model is provided (504). For example, in some embodiments a developer may indicate in a request to define a new case model, and/or may be prompted to indicate, a "problem domain" with which the case model is associated, such as a loan application, an employment application, a product development or other business project, a healthcare or other patient, a claim for reimbursement or benefits, or a matter being handled by a professional or personal service provider, such as a lawsuit, home renovation project, etc. In various embodiments, the problem domain-specific developer interface provides access to problem domain-specific elements to assist the developer in defining the case model. For example, a loan application typically is initiated by a loan applicant submitting an application, and typically involves gathering information to verify and evaluate the applicant's identity, financial assets, income, creditworthiness, etc. In some embodiments, a template may be provided to be used as a starting point. The developer uses visual or other tools to customize the template as desired to define a case model.

Once the developer has completed and submitted the case model definition, the case model definition is received, stored, and deployed (506). In some embodiments, a runtime representation of the definition is processed, e.g., upon submission by the developer, to generate an XML or other structured data file that embodies the case model as defined. Deployment in various embodiments includes making the case model definition available to be used to instantiate case management instances based on the case model, e.g., individual loan application cases.

Figure 6:
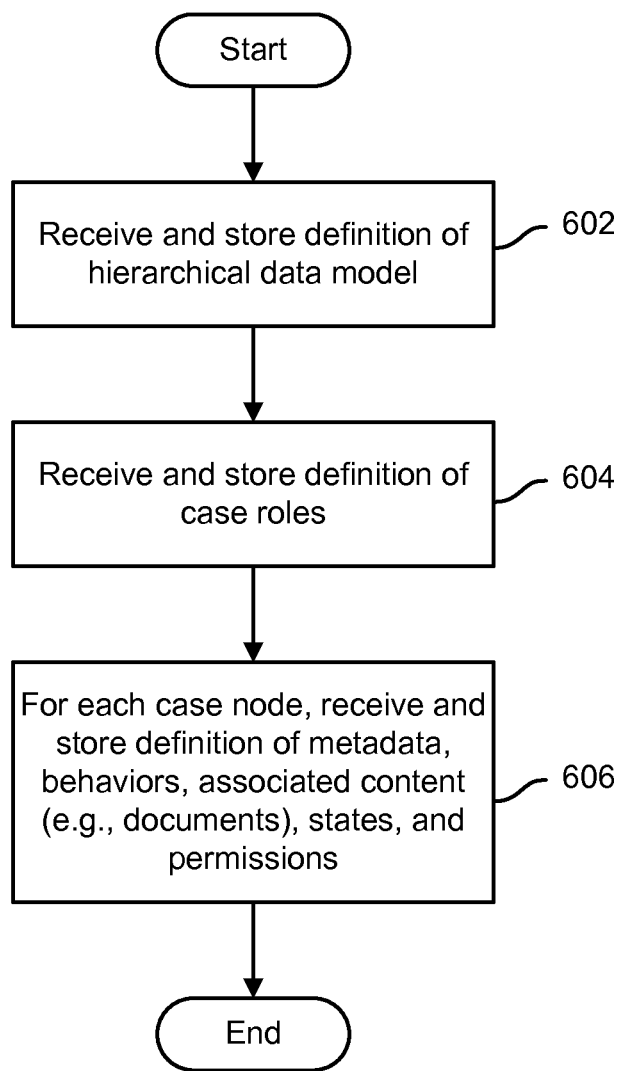
FIG. 6 is a flow chart illustrating an example embodiment of a process to receive and store a case model.

FIG. 6 is a flow chart illustrating an example embodiment of a process to receive and store a case model. In some embodiments, the process of FIG. 6 is included in step 506 of FIG. 5. In the example shown, a definition of a hierarchical/nested data model is received (602). For example, a user interface that enables a developer to drag and drop case nodes onto a canvass and to indicate hierarchical relationships between case nodes may be provided and used by the developer to define a hierarchical/nested data model. A definition of case roles is received and stored (604). For example, a "loan application" case model may include user roles such as "loan initiator", "underwriter", "appraiser", etc. For each case node in the hierarchical/nested data model, a definition of metadata, behaviors, content (e.g., documents), states/phases (and transitions between states/phases), and/or permissions (e.g., by case role) is received (606). For example, in various embodiments a developer interface may be provided to enable a developer to select a case node and be presented with an interface to define a state machine for that case node.

Figure 7:
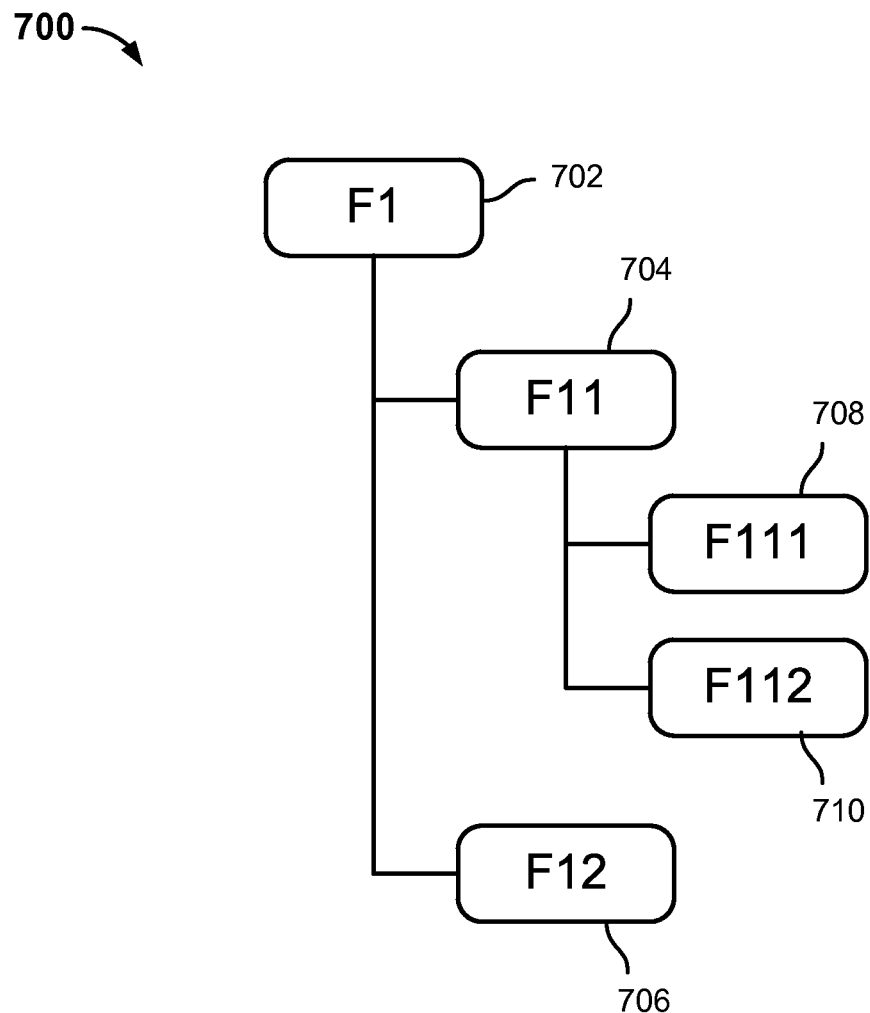
FIG. 7 is a block diagram illustrating an example of a hierarchical data model in an embodiment of a case management system.

FIG. 7 is a block diagram illustrating an example of a hierarchical data model in an embodiment of a case management system. In various embodiments, a case model, such as one defined using the processes of FIGS. 5 and 6, may include a hierarchical/nested container model, such as the one shown in FIG. 7. In the example shown, hierarchical/nested container model 700 includes a root node 702 at a first (highest) hierarchical level. At a first hierarchical level below the root node, nodes 704 and 706 are included. Finally, in a lowest hierarchical level (in this example), node 704 has two "case leaf nodes" 708 and 710. In various embodiments, metadata, behaviors, permissions, etc. that have been defined for a case node extend (or in some embodiments may at the option of the case model developer be extended) to child case nodes of the case node at which such metadata, behaviors, permissions, etc. have been defined.

Figure 8:
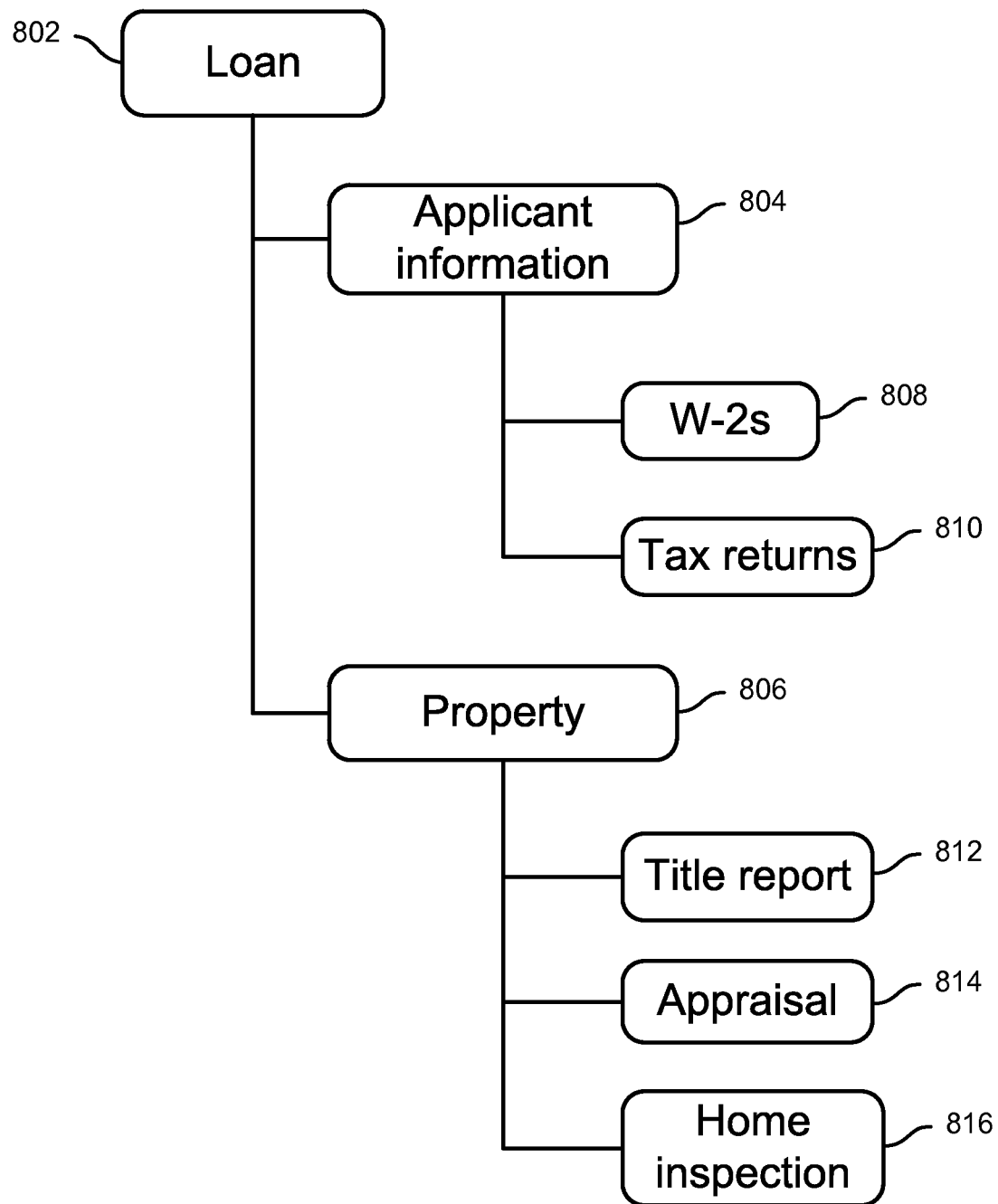
FIG. 8 is a block diagram illustrating an example of a hierarchical data model in an embodiment of a case management system.

FIG. 8 is a block diagram illustrating an example of a hierarchical data model in an embodiment of a case management system, such as case management system 206 of FIG. 2. In particular, a hierarchical/nested container model for a home loan application is illustrated. In the example shown, each instance of a "loan" case includes a root node 802 and two first level sub-nodes 804 and 806, in this example one (804) for financial information of the applicant and associated processing, and another (806) for information and processing associated with the home to be purchased using the loan. The "applicant information" sub-node 804 includes a first case leaf node 808 for Forms W-2 and a second case leaf node 810 for the applicant's tax returns. "Property" sub-node 806 includes case leaf nodes 812, 814, and 816 for the title report, appraisal report, and home inspection report, respectively. In various embodiments, the case model definition may include for each case node a definition of metadata and/or behaviors for that case node. For case leaf nodes, such as case leaf nodes 808, 810, 812, 814, and 816, the case model definition may include information regarding documents or other content objects to be associated with such nodes, including in some embodiments an identification of a storage location in which such documents are to be stored, e.g., in a content repository such as repository 214 of FIG. 2 associated with a content management system such as content management system 212 of FIG. 2.

Figure 9:
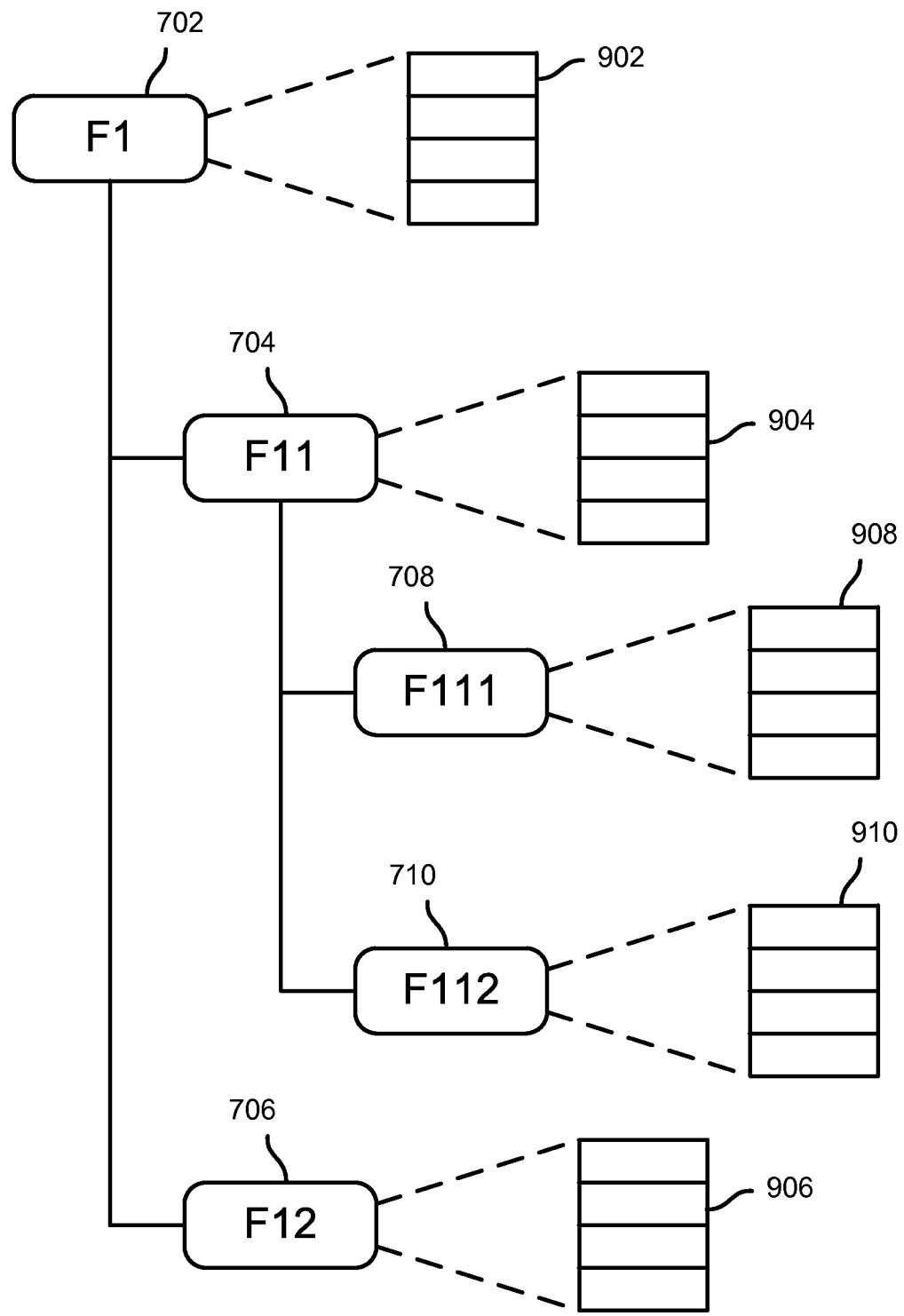
FIG. 9 is a block diagram illustrating an example of a case model and associated trait definitions in an embodiment of a case management system.

FIG. 9 is a block diagram illustrating an example of a case model and associated trait definitions in an embodiment of a case management system. In the example shown, each case node (702, 704, 708, 710, and 706) of the case model shown in FIG. 7 is shown in FIG. 9 to have associated therewith a corresponding trait definition, i.e., 902, 904, 908, 910, and 906, respectively. In various embodiments, at each case node, the corresponding trait definition may include a definition of a set of one or more metadata values or other attributes associated with that case node and/or behaviors associated with such metadata values and/or other behaviors associated with that case node. In various embodiments, a case model definition may include a definition of a hierarchical/nested container model, such as case model 700 of FIG. 7, and for each case node in the hierarchical/nested container model the case model definition may include a corresponding trait definition, such as trait definitions 902, 904, 908, 910, and 906 of FIG. 9. In various embodiments, the trait definitions may be used by a case management system, such as case management system 206 of FIGS. 2 and 3, to create and use case management instances that implement the trait definition. For example, metadata attributes associated with a case node by a trait definition may be used to create for a case instance a corresponding data structure to store case instance-specific values for such metadata attributes.

Similarly, behaviors included in the trait definition may be implemented. For example, a behavior to send a notification when a metadata attribute is updated with a new value for a case instance may be implemented by generating and sending the notification as defined in the trait definition. In some embodiments, a behavior as defined in a trait definition may be associated with metadata attributes and/or may use or otherwise depend on case instance variables, such as users assigned to case roles with respect to a case instance, etc. For example, a trait definition may specify that a notification should be sent to a user(s) assigned to a specified case role with respect to the case instance.

Figure 10:
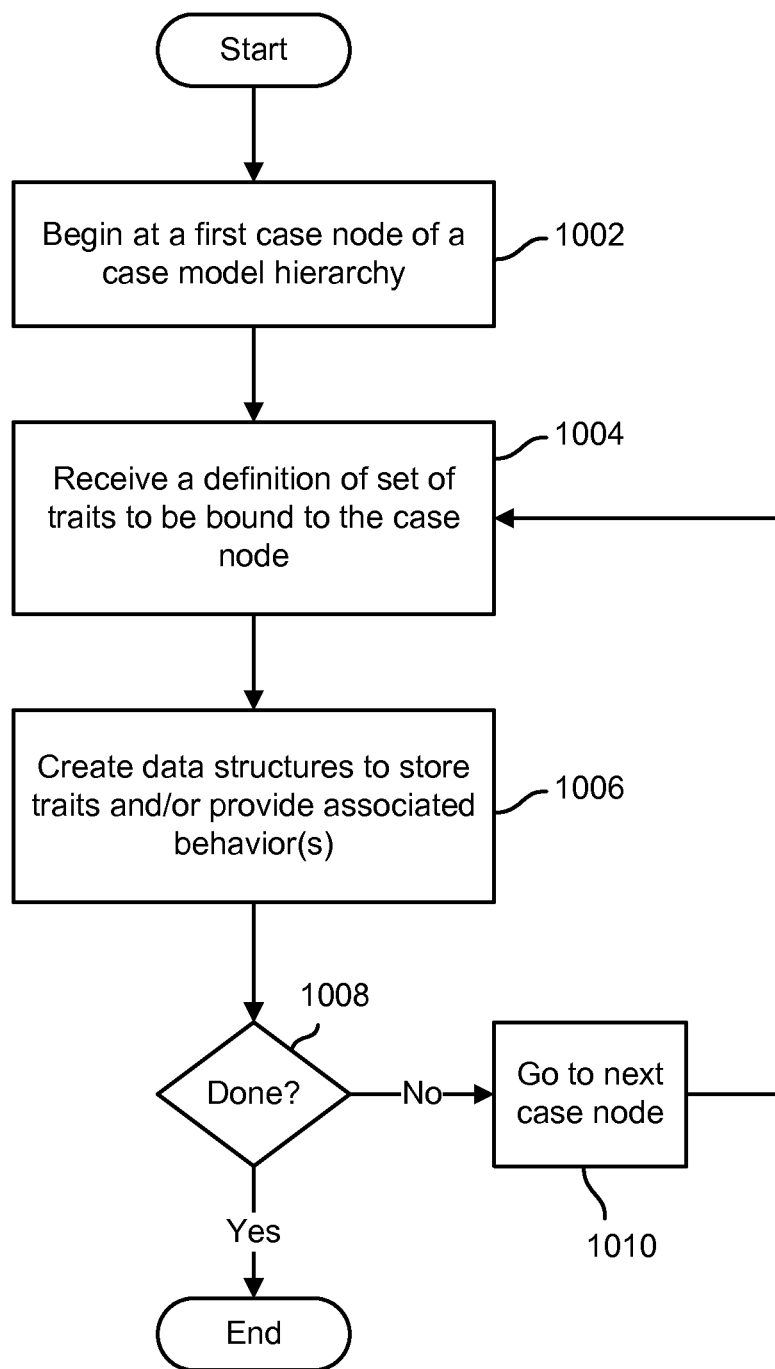
FIG. 10 is a flow chart illustrating an example embodiment of a process to bind traits to case nodes.

FIG. 10 is a flow chart illustrating an example embodiment of a process to bind traits to case nodes. In some embodiments, the process of FIG. 10 may be implemented by a case management system, such as case management system 206 of FIGS. 2 and 3, to bind traits to case nodes as defined in a case model definition. In some embodiments, the case model definition may comprise an XML or other structured data file. A hierarchical/nested container model portion of the case model definition may be parsed to determine and generate runtime data structures that represent the respective case node and their relationships to each other. In the example shown in FIG. 10, trait definition processing begins at a first case node in the hierarchy (1002), e.g., a root node. A definition of a set of traits to be associated with the case node being processed (initially in this example the root node) is received (1004). For example, a trait definition portion of the case model definition may be parsed to obtain the trait definition for the root node. Data structures to store traits (e.g., metadata values) and/or to be used to provide behaviors defined in the trait definition are created (1006) and associated with the case node to which they are to be bound per the case model definition. If there are further trait definitions to be processed (1008), processing advances to a next case node (1010) and the trait definition for that case node is processed (1004, 1006). Processing continues until all trait definitions for all case nodes have been processed (1008).

Figure 11:
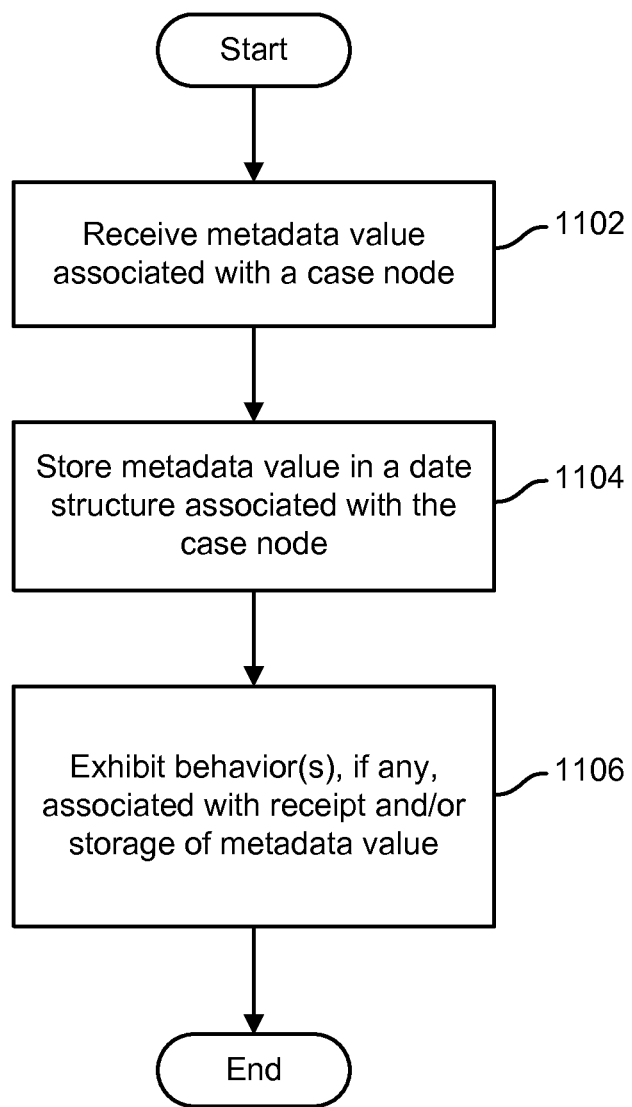
FIG. 11 is a flow chart illustrating an example embodiment of a process to store and process case node traits.

FIG. 11 is a flow chart illustrating an example embodiment of a process to store and process case node traits. In various embodiments, data structures created as described above in connection with FIG. 10 may be used to store data values as in the process of FIG. 11. In some embodiments, the process of FIG. 11 is implemented by a case management system, such as case management system 206 of FIGS. 2 and 3, to store case instance-specific metadata values for traits bound to case nodes as defined in a case model definition, and/or to exhibit associated behaviors as defined in the case model definition. In the example shown, a metadata value associated with a case node of a case instance is received (1102). For example, a user may provide user input, via a user interface, to provide a value for a metadata or other attribute defined in a trait definition for a case node. The metadata value is stored in a data structure associated with the case node of the case instance, in a location associated with a corresponding trait as defined in the case model definition (1104). Any behaviors associated with receipt and/or storing the metadata value is/are exhibited (1106), e.g., sending a notification, triggering a business process, transitioning a state machine of the case node to a destination phase/state, etc.

Figure 12:
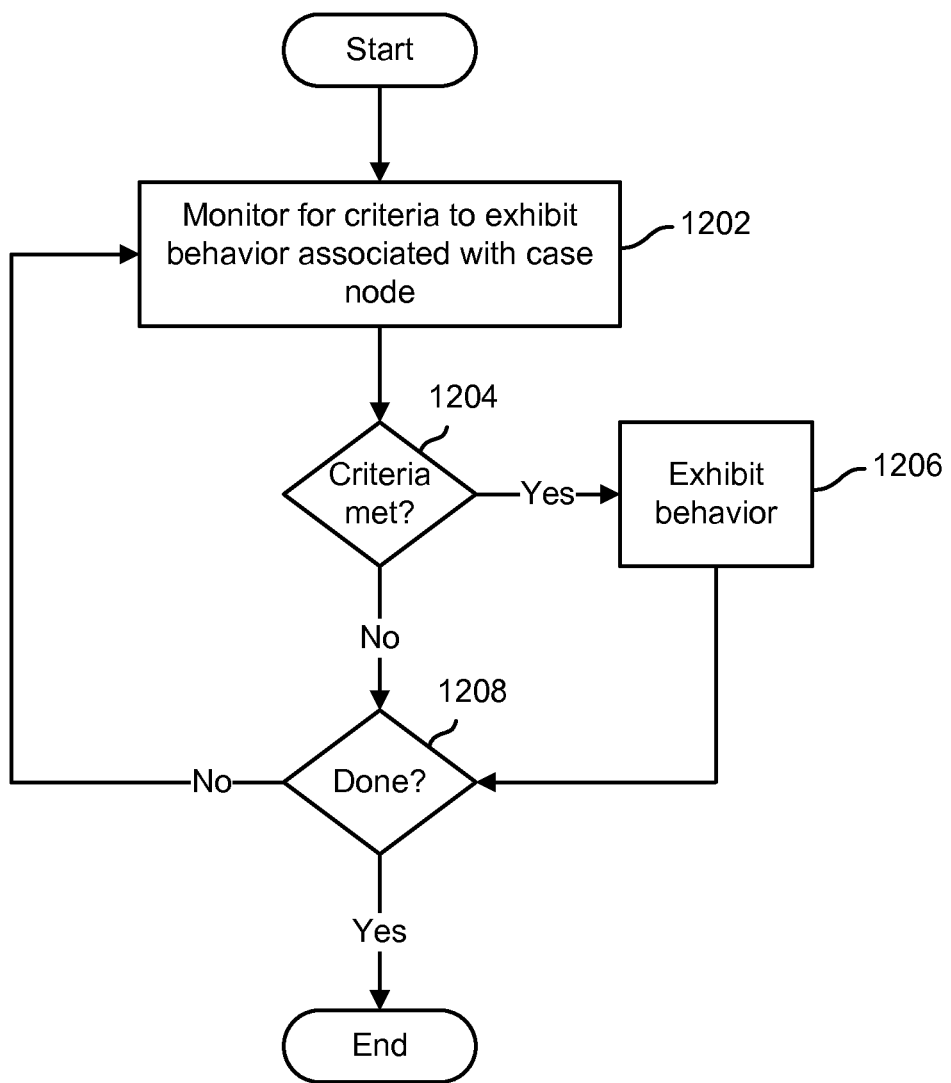
FIG. 12 is a flow chart illustrating an example embodiment of a process to exhibit behaviors associated with case nodes.

FIG. 12 is a flow chart illustrating an example embodiment of a process to exhibit behaviors associated with case nodes. In various embodiments, the process of FIG. 12 may be used to implement behaviors defined in a trait definition associated with a case node and/or instances thereof. In some embodiments, the process of FIG. 12 is implemented by a case management system, such as case management system 206 of FIGS. 2 and 3. In the example shown, criteria associated with exhibiting a behavior as defined in a trait definition associated with a case node are monitored (1202). For example, a listening entity may be configured to listen for an event, condition, and/or other criteria defined in the trait definition as triggering the behavior. If the criteria is/are determined to have been met (1204), the behavior as defined in the trait definition for the case node is exhibited (1206). If not (1204), monitoring continues (1208, 1202) until the process ends, e.g., the case instance is deactivated and associated values stored.

Figure 13:
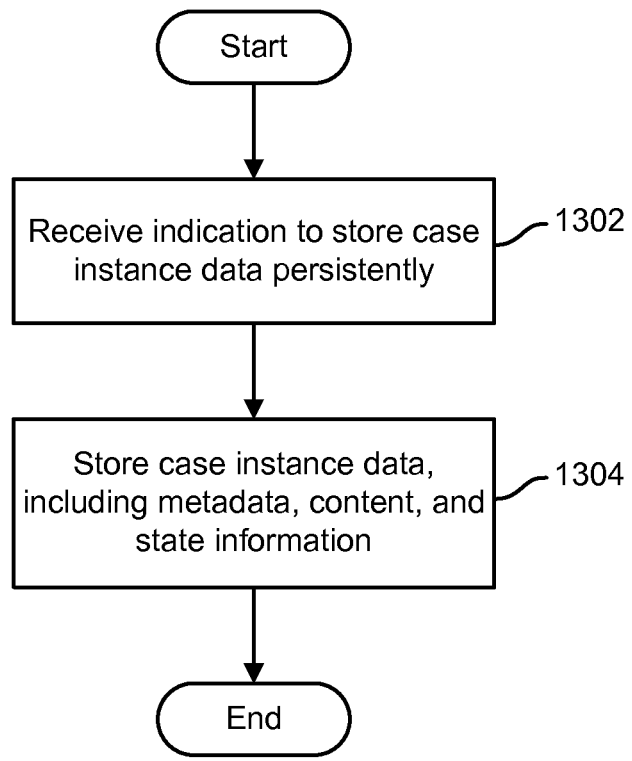
FIG. 13 is a flow chart illustrating an example embodiment of a process to store persistently data associated with traits bound to case nodes.

FIG. 13 is a flow chart illustrating an example embodiment of a process to store persistently data associated with traits bound to case nodes. In some embodiments, the process of FIG. 13 is implemented by a case management system, such as case management system 206 of FIGS. 2 and 3. In the example shown, an indication is received to store case instance data persistently (1302). For example, a case instance that has been created and had case instance variables populated with data values may be desired to be stored persistently. Alternatively, a case instance that has been accessed by using a case model and previously stored case instance data to instantiate the case instance may be desired to be stored persistently, for example once a user is done using the case instance actively. The case instance data is stored persistently, including metadata, content, and state information bound to the respective case nodes of the case instance (1304). In some embodiments, a database table and/or other data structure may be used to store case instance data persistently. If some embodiments, a schema or other structure of a database table or other data structure may be created and/or may have been created previously based at least in part on a case model definition of which the case instance is an instance. For example, the respective trait definitions of case nodes comprising the case model may be parsed and processed in some embodiments to generate and/or comprise a schema to be used to store corresponding case instance data persistently.

In another example, assume the following levels of hierarchy, which are all container nodes, have been defined:

Engagement Space→Project→Checklist→ChecklistItem

Further assume that within ChecklistItem there is a Case Leaf Node, e.g., "ChecklistItemContent" which represents the documents within that container. This hierarchy represents Engagement Collaboration kinds of solutions. Under various situations, and runtime modes, different sets of traits could be attached at each level, e.g., to meet the requirements of different "verticals". For example, in the case of a Supplier Exchange vertical solution, one could have at a) Engagement Space, a trait called "Capital Project" that captures a certain set of metadata applicable to Capital Projects. Likewise, at b) Project, one could have a trait called "Supplier Contract" which captures metadata related to Supplier Contracts, etc. With each set of traits associated behavior may be defined. In various embodiments, the same hierarchy could be used to serve a different vertical, such as the Commercial Loan Engagement Space. For the latter vertical, at a) Engagement Space, a trait called 'Customer Engagement Space" could be attached. That trait may capture, for example, "Customer data" such as customer name, address, and so on. Similarly, at b) Project, one could have a trait called "Loan" which could capture the information related to a commercial loan with regards to this customer. On these traits one could define events and model behavior if required.

In various embodiments, binding traits and behavior to case model nodes, as disclosed herein, enables case node-specific data to be gathered and managed and associated behaviors to be defined and provided. In various embodiments, traits and associated behaviors may be defined or redefined, with respect to the same hierarchical data model/ structure, enabling the same structure to be reused for different types of cases, with the differences between them being reflected in the traits and behaviors that are bound to the respective case nodes of the data model.

Although the foregoing embodiments have been described in some detail for purposes of clarity of understanding, the technology is not limited to the details provided. There are many alternative ways of implementing the technology. The disclosed embodiments are illustrative and not restrictive.

What is claimed is:

1. A computer-implemented method for electronic case management, comprising:
   accessing a case model definition, the case model definition comprising:
      a hierarchical data model definition defining a hierarchy of case nodes;
      a metadata definition defining metadata attributes for case nodes in the hierarchy of case nodes;
      a behavior definition defining metadata associated behaviors; and
      case roles and a definition of permissions by case roles for the case nodes in the hierarchy of case nodes;
   instantiating a case instance using the case model definition, instantiating the case instance further comprising creating associated data structures for the case nodes from the hierarchy of case nodes to store metadata values for the metadata attributes defined for the case nodes by the metadata definition and to provide the metadata associated behaviors defined by the behavior definition;
   receiving instance specific metadata values for the metadata attributes defined for the case nodes in the metadata definition and storing the instance specific metadata values in the associated data structures; and
   executing any of the metadata associated behaviors defined by the behavior definition and associated with receiving or storing the instance specific metadata values for the metadata attributes.

2. The computer-implemented method of claim 1, wherein the behavior definition defines a criterion for triggering a first metadata associated behavior associated with a first metadata attribute defined for a first case node.

3. The computer-implemented method of claim 2, further comprising configuring a listener to listen for the criterion.

4. The computer-implemented method of claim 2, wherein the criterion comprises at least one of an event or a condition.

5. The computer-implemented method of claim 2, further comprising:
   monitoring for the criterion; and
   based on detecting that the criterion has been met, executing the first metadata associated behavior with respect to the case instance.

6. The computer-implemented method of claim 5, wherein the criterion comprises storing an instance specific metadata value for the first metadata attribute.

7. The computer-implemented method of claim 1, further comprising:
   automatically extending a first metadata attribute defined in the metadata definition for a parent case node to a child case node in the hierarchy of case nodes.

8. The computer-implemented method of claim 1, further comprising automatically extending a first metadata associated behavior defined in the behavior definition for a parent case node to a child case node in the hierarchy of case nodes.

9. The computer-implemented method of claim 1, wherein the metadata associated behaviors include at least one of sending a notification, triggering a business process, or transitioning a state machine to a destination phase/state.

10. A computer program product comprising a non-transitory, computer-readable medium storing thereon electronic case management software, the electronic case management software comprising instructions executable for:

accessing a case model definition, the case model definition comprising:
  a hierarchical data model definition defining a hierarchy of case nodes;
  a metadata definition defining metadata attributes for case nodes in the hierarchy of case nodes;
  a behavior definition defining metadata associated behaviors; and
  case roles and a definition of permissions by case roles for the case nodes in the hierarchy of case nodes;
instantiating a case instance using the case model definition, instantiating the case instance further comprising creating associated data structures for the case nodes from the hierarchy of case nodes to store metadata values for the metadata attributes defined for the case nodes by the metadata definition and to provide the metadata associated behaviors defined by the behavior definition;
receiving instance specific metadata values for the metadata attributes defined for the case nodes in the metadata definition and storing the instance specific metadata values in the associated data structures; and
executing any of the metadata associated behaviors defined by the behavior definition and associated with receiving or storing the instance specific metadata values for the metadata attributes.

11. The computer program product of claim 10, wherein the behavior definition defines a criterion for triggering a first metadata associated behavior associated with a first metadata attribute defined for a first case node.

12. The computer program product of claim 11, further comprising instructions executable for configuring a listener to listen for the criterion.

13. The computer program product of claim 11, wherein the criterion comprises at least one of an event or a condition.

14. The computer program product of claim 11, further comprising instructions executable for:
  monitoring for the criterion; and
  based on detecting that the criterion has been met, executing the first metadata associated behavior with respect to the case instance.

15. The computer program product of claim 14, wherein the criterion comprises storing an instance specific metadata value for the first metadata attribute.

16. The computer program product of claim 10, further comprising instructions executable for automatically extending a first metadata attribute defined in the metadata definition for a parent case node to a child case node in the hierarchy of case nodes.

17. The computer program product of claim 10, further comprising instructions executable for automatically extending a first metadata associated behavior defined in the behavior definition for a parent case node to a child case node in the hierarchy of case nodes.

18. The computer program product of claim 10, wherein the metadata associated behaviors include at least one of sending a notification, triggering a business process, or transitioning a state machine to a destination phase/state.

19. A computer-implemented method for electronic case management, comprising:
  accessing a case model definition, the case model definition comprising:
    a hierarchical data model definition defining a hierarchy of case nodes;
    a metadata definition defining metadata attributes for case nodes in the hierarchy of case nodes; and
    a behavior definition defining metadata associated behaviors;
  instantiating a case instance using the case model definition, instantiating the case instance further comprising creating associated data structures for the case nodes from the hierarchy of case nodes to store metadata values for the metadata attributes defined for the case nodes by the metadata definition and to provide the metadata associated behaviors defined by the behavior definition;
  receiving instance specific metadata values for the metadata attributes defined for the case nodes in the metadata definition and storing the instance specific metadata values in the associated data structures; and
  executing any of the metadata associated behaviors defined by the behavior definition and associated with receiving or storing the instance specific metadata values for the metadata attributes, the method further comprising
  automatically extending to a child case node of a parent case node in the hierarchy of case nodes at least one of a first metadata attribute defined for the parent case node in the metadata definition or a first metadata associated behavior defined for the parent case node in the behavior definition.

20. The computer-implemented method of claim 19, wherein the behavior definition defines a criterion for triggering the first metadata associated behavior.

21. The computer-implemented method of claim 20, further comprising:
  monitoring for the criterion; and
  based on detecting that the criterion has been met, executing the first metadata associated behavior with respect to the case instance.

22. A computer program product comprising a non-transitory, computer-readable medium storing thereon electronic case management software, the electronic case management software comprising instructions executable for:
  accessing a case model definition, the case model definition comprising:
    a hierarchical data model definition defining a hierarchy of case nodes;
    a metadata definition defining metadata attributes for case nodes in the hierarchy of case nodes;
    a behavior definition defining metadata associated behaviors;
  instantiating a case instance using the case model definition, instantiating the case instance further comprising creating associated data structures for the case nodes from the hierarchy of case nodes to store metadata values for the metadata attributes defined for the case nodes by the metadata definition and to provide the metadata associated behaviors defined by the behavior definition;
  receiving instance specific metadata values for the metadata attributes defined for the case nodes in the metadata definition and storing the instance specific metadata values in the associated data structures; and
  executing any of the metadata associated behaviors defined by the behavior definition and associated with receiving or storing the instance specific metadata values for the metadata attributes, the instructions further for:
  automatically extending to a child case node of a parent case node in the hierarchy of case nodes at least one of a first metadata attribute defined for the parent case node in the metadata definition or a first metadata associated behavior defined for the parent case node in the behavior definition.

23. The computer program product of claim 22, wherein the behavior definition defines a criterion for triggering the first metadata associated behavior.

24. The computer program product of claim 23, further comprising instructions executable for:
   monitoring for the criterion; and
   based on detecting that the criterion has been met, executing the first metadata associated behavior with respect to the case instance.

* * * * *